United States Patent
Dickey

(10) Patent No.: US 7,639,985 B2
(45) Date of Patent: Dec. 29, 2009

(54) USE OF SCH BURSTS FOR CO-CHANNEL INTERFERENCE MEASUREMENTS

(75) Inventor: Sergey L. Dickey, Fairfax, VA (US)

(73) Assignee: PC-TEL, Inc., Bloomingdale, IL (US)

( * ) Notice: Subject to any disclaimer, the term of this patent is extended or adjusted under 35 U.S.C. 154(b) by 796 days.

(21) Appl. No.: 11/366,115

(22) Filed: Mar. 2, 2006

(65) Prior Publication Data
US 2007/0207740 A1 Sep. 6, 2007

(51) Int. Cl.
H04B 1/00 (2006.01)
(52) U.S. Cl. .............. 455/63.1; 455/114.2; 455/278.2; 455/296; 455/501; 370/345; 375/146
(58) Field of Classification Search .............. 455/63.1, 455/114.2, 278.1, 296, 501, 76, 563, 165.1, 455/183.1, 465.1; 370/337, 328, 345; 375/146, 375/133, 135; 342/453
See application file for complete search history.

(56) References Cited

U.S. PATENT DOCUMENTS

| | | | | |
|---|---|---|---|---|
| 4,445,118 A * | 4/1984 | Taylor et al. | ........... | 342/357.09 |
| 5,278,539 A * | 1/1994 | Lauterbach et al. | ..... | 340/539.18 |
| 5,452,319 A * | 9/1995 | Cook et al. | ........... | 375/133 |
| 5,812,522 A * | 9/1998 | Lee et al. | ........... | 370/206 |
| 5,884,010 A * | 3/1999 | Chen et al. | ........... | 704/228 |
| 5,926,762 A | 7/1999 | Arpee et al. | | |
| 6,038,250 A * | 3/2000 | Shou et al. | ........... | 375/143 |
| 6,067,311 A * | 5/2000 | Morton et al. | ........... | 372/57 |
| 6,088,586 A * | 7/2000 | Haverty | ........... | 455/422.1 |
| 6,178,195 B1 * | 1/2001 | Durboraw et al. | ........... | 375/136 |
| 6,201,499 B1 * | 3/2001 | Hawkes et al. | ........... | 342/387 |
| 6,226,317 B1 * | 5/2001 | Bruckert et al. | ........... | 375/146 |
| 6,275,186 B1 * | 8/2001 | Kong | ........... | 342/363 |
| 6,324,382 B1 | 11/2001 | Dolder | | |
| 6,349,207 B1 | 2/2002 | Monot et al. | | |
| 6,480,523 B1 * | 11/2002 | Kondo | ........... | 375/140 |
| 6,516,189 B1 * | 2/2003 | Frangione et al. | ........... | 455/405 |
| 6,522,882 B1 * | 2/2003 | Chen et al. | ........... | 455/439 |
| 6,526,532 B1 * | 2/2003 | Cinkler et al. | ........... | 714/712 |
| 6,591,100 B1 * | 7/2003 | Dent | ........... | 455/434 |
| 6,827,483 B2 * | 12/2004 | Kondo | ........... | 375/141 |
| 6,931,235 B2 | 8/2005 | Klien et al. | | |
| 7,065,351 B2 * | 6/2006 | Carter et al. | ........... | 455/423 |
| 7,474,718 B2 * | 1/2009 | Liu | ........... | 375/344 |
| 7,519,387 B2 * | 4/2009 | Won | ........... | 455/550.1 |
| 7,522,884 B2 * | 4/2009 | Turner et al. | ........... | 455/67.11 |

(Continued)

Primary Examiner—Minh D Dao
(74) Attorney, Agent, or Firm—Husch Blackwell Sanders Welsh & Katz

(57) ABSTRACT

A method and apparatus for identifying signal sources in a multi-source signal. Levels of signal components transmitted by each of the co-channel base stations in the area under test in a wireless network are measured and associated with the appropriate (originating) base station in the presence of co-channel and adjacent-channel interference without interrupting service by sensing and responding to received, variable, patterns.

7 Claims, 5 Drawing Sheets

U.S. PATENT DOCUMENTS

| | | |
|---|---|---|
| 2001/0034208 A1 | 10/2001 | Kline et al. |
| 2001/0043643 A1* | 11/2001 | Ogami ........................ 375/147 |
| 2003/0176190 A1 | 9/2003 | Mohebbi et al. |
| 2003/0186653 A1 | 10/2003 | Mohebbi et al. |
| 2004/0166809 A1* | 8/2004 | Dickey .................... 455/67.11 |
| 2005/0130698 A1* | 6/2005 | Won ........................ 455/550.1 |
| 2007/0009011 A1* | 1/2007 | Coulson ..................... 375/144 |
| 2007/0061740 A1* | 3/2007 | Marini ....................... 715/762 |
| 2007/0194923 A1* | 8/2007 | Karr ........................ 340/572.1 |
| 2008/0158059 A1* | 7/2008 | Bull et al. ................... 342/387 |
| 2009/0018680 A1* | 1/2009 | Matsuoka .................... 700/94 |
| 2009/0041104 A1* | 2/2009 | Bogdan ..................... 375/226 |

* cited by examiner

BCCH + CCCH
(DOWNLINK)

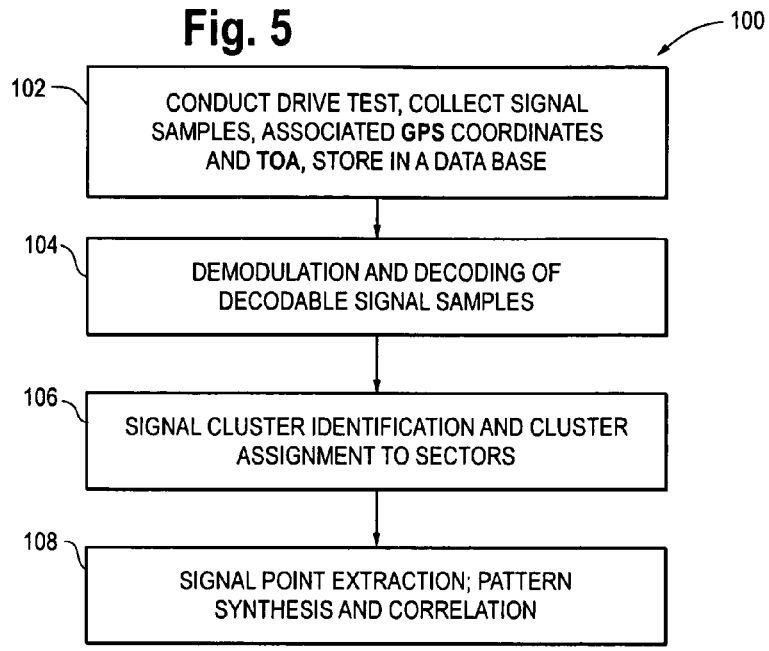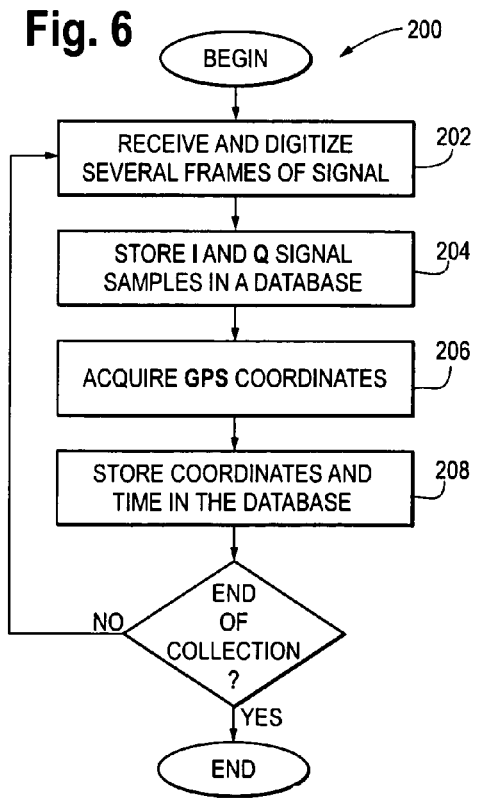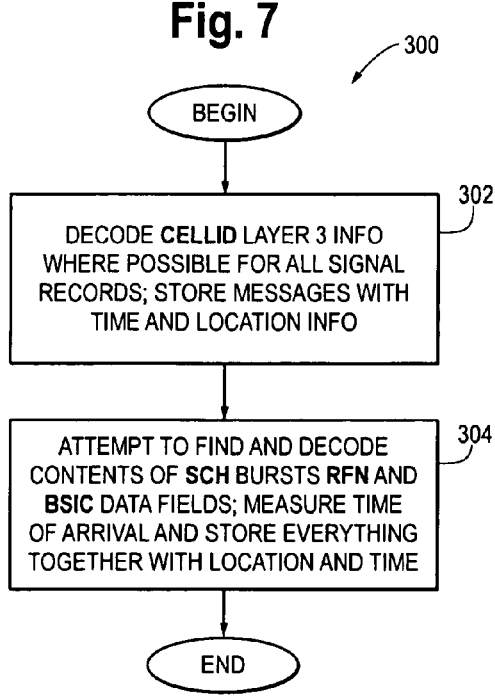

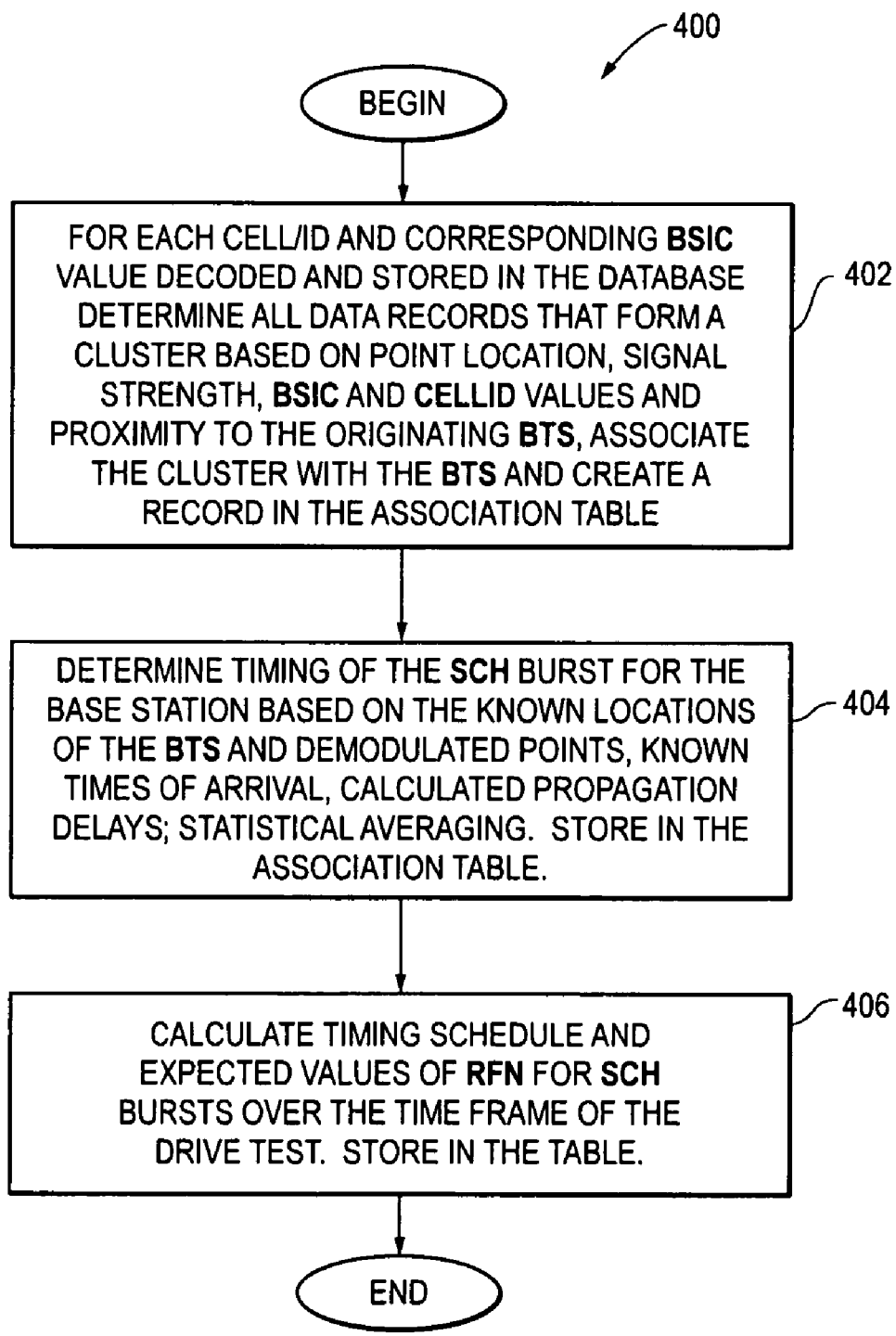

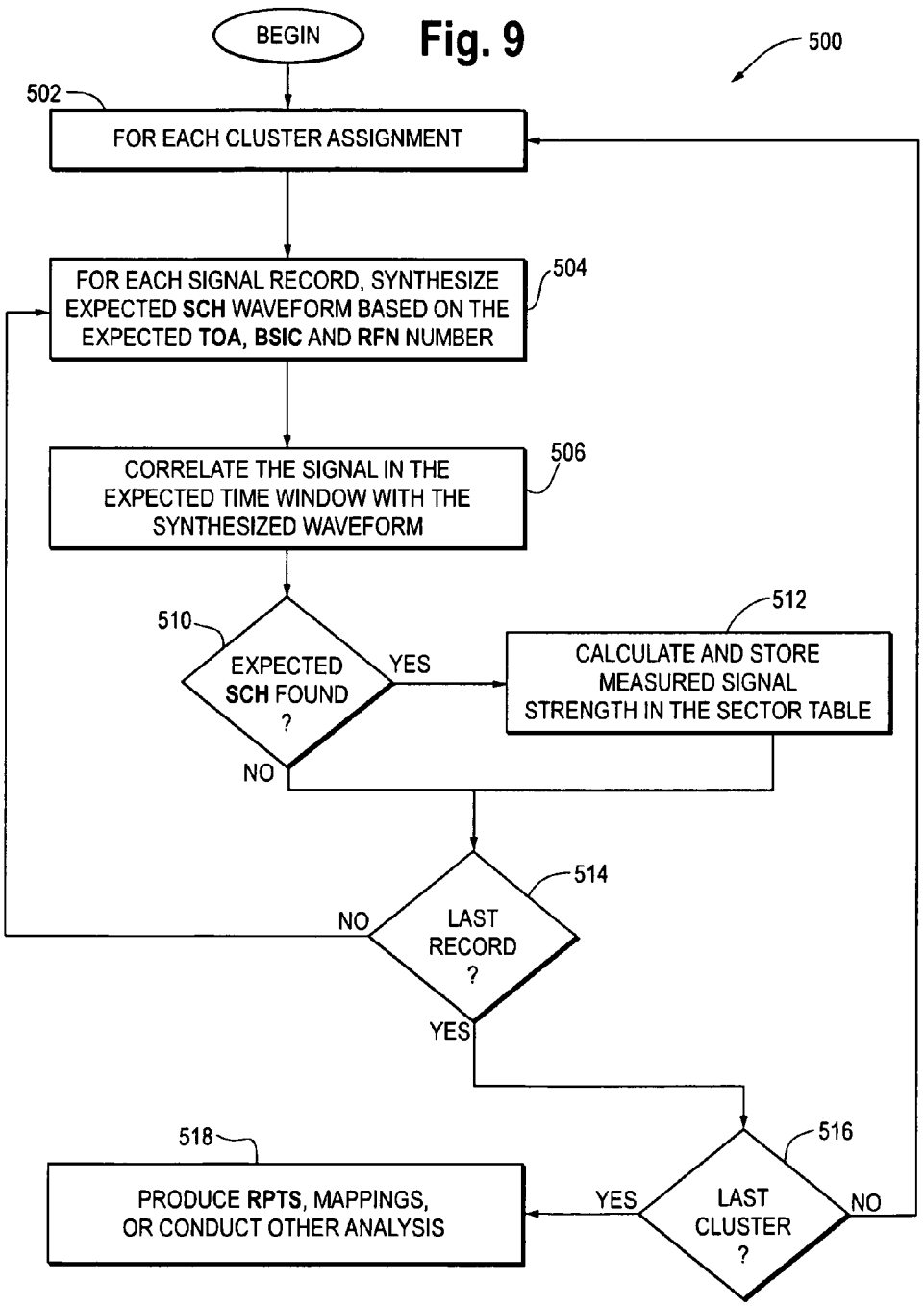

USE OF SCH BURSTS FOR CO-CHANNEL INTERFERENCE MEASUREMENTS

FIELD OF INVENTION

The invention relates generally to the field of Time Division Multiple Access (TDMA) Cellular and Personal Communications System (PCS) networks. More particularly, the present invention relates to a method and apparatus for identifying signal sources in a multi-source signal.

BACKGROUND OF THE INVENTION

It is well known that one of the major limitations in cellular and PCS wireless telephone networks is the so-called co-channel interference. In the case of TDMA networks, such as GSM or NADC (otherwise known as "IS-136"), co-channel interferences are often caused by the fact that the spectrum allocated to the system is reused multiple times ("frequency reuse"). The problem may be more or less severe depending on the reuse factor, but in all cases a signal, received by a handset, will contain not only the desired forward channel from the current cell, but also signals originating in more distant cells. If the interference from a distant cell causes a degradation of the ability of the handset to receive the desired signal correctly, it becomes important to identify the source of co-channel interference and measure the relative strength of interference relative to the desired signal.

It is important when performing a drive test of a wireless system to be able to separate signals that are coming from different base stations. Two phenomena make such a separation difficult: co-channel interference and adjacent-channel interference. When several base stations transmit on the same frequency, there are areas in the coverage region where conventional methods of power measurement are impractical or difficult to use when one needs to measure power from each of the interfering stations. This is also true for the case when stations operate on adjacent channels in close proximity.

A number of methods have been used to achieve the goal of signal separation. For example, drive-testing (measuring signal strengths with a scanning mobile receiver on board a test vehicle) in a system where each of the sectors uses a single unique frequency is described in U.S. Pat. No. 5,926,762.

Methods based on the association of signals with transmitting base stations based on the ability to decode the so-called "color codes" (base stations' IDs) have also been used. If a color code can be detected, the signal is ascribed to the nearest base station with this ID. Since color codes cannot be decoded using conventional receivers or handsets in presence of strong interference (co-channel or adjacent-channel), more advanced techniques of signal separation have been devised for color-code decoding when a signal, or signal component, is masked by interference.

One such technique of associating signals with base stations involves joint-decoding of the constituent signal components with channel estimation for each of the signal paths involved (described in U.S. Pat. No. 6,324,382, assigned to Agilent Technologies, Inc.). This method relies on an accurate estimation of the transmission channel characteristics for signal paths from each of the base stations contributing to the mixture of interferers at the reception site. Under conditions where the residual error of signal estimation due to the limitations of the complexity of channel modeling exceeds the level of weaker signals (or even the weaker of the two signals) and taking into account the realistic constraints of hardware complexity, the detection of the color code is all but impossible. The underlying reason for this result is that the color code embedded into the signal does not possess redundancy above what is normal for any digital code in the signal (in traffic and control channels), so that there is no additional processing gain when decoding color codes (BSIC in the case of GSM). Apart from poor decoding performance in practice, devices based on this approach suffer from slow scanning performance.

Another approach, described in U.S. Pat. No. 6,349,207, uses directional antenna arrays and time-space diversity to tune in a serial manner to one spatial signal component at a time with the exclusion, or at least attenuation, of the rest of the signal components. When an acceptable signal-to-noise ratio for a given interfering component is obtained, it is possible to demodulate and decode the color code corresponding to the station that transmitted the isolated component. This process is assisted by the detection of the interfering components in the signal by using correlations with known patterns (training sequences) in the signal. Knowing the number of components facilitates the time-spatial filtering algorithm. Although the described method apparently achieves the goal of associating interfering signal components with color codes and even with base station locations (by using RTOA-based triangulation), this technique requires complex and expensive equipment.

Another approach to the task of signal-component separation and signal identification is described in U.S. patent application Ser. No. 09/795,225 filed Feb. 28, 2001, now U.S. Pat. No. 6,931,235 and assigned to the assignee hereof. The Ser. No. 09/795,225 application is incorporated by reference herein, in its entirety, for all purposes. This approach is based on using correlation with known patterns in a signal (synchronization patterns and training sequences, for example), which yields a significant processing gain. This gain allows detection of the presence of an interfering component even when its level is substantially below the levels of interfering signals. Signal identification (i.e., association with transmitting stations) is based on the ability to track individual components during a drive test based on the knowledge of their respective times of arrival. By observing each of the detected components separately in the course of the drive test, one is able to relate the component to a geographical position where its contents, including the color code, can be easily and reliably determined. Then, by using the information logged in a data base for the whole life span of the component, all instances of the detection of this component are back-annotated with the BSIC value of the signal, or the name of the base station determined based on its geographical location at the moment of signal determination (being the closest station transmitting on the frequency channel when the component strength was at the maximum value).

The advantage of the correlation method is that it relies on a robust characteristic of the signal (correlation with a known pattern) that possesses processing gain. However, using for correlation only available fixed patterns has several drawbacks. They can be illustrated using the example of the GSM standard. The following fixed patterns can be used for the goal of signal component correlation: the frequency-correction burst, FCCH; the midamble of the synchronization burst, SCH; 8 distinct training sequences in the middle of traffic bursts, TCH.

The following observations can be made about the above patterns: FCCH is probably the most advantageous of the patterns for correlation due to its substantial length (a whole burst of about 160 symbols, including guard bits. The problem with the pattern is that it consists of all zero bits (a piece of a CW waveform when GMSK-modulated). Because of this, firstly, its autocorrelation function is triangular in shape and wide (300 symbols). This leads to a poor ability of the instrument to discern between closely-spaced (in time) signals coming from different base stations. Another manifestation of this phenomenon is that at low signal-to-interference or signal-to-noise levels, the apparent time-of-arrival of a signal has a significant time uncertainty, displaying jitter from measurement to measurement.

In view of the above, in order not to miss too many measurement results, one has to open the correlation time window wider, inviting more false correlations into the result. Secondly, since any run of several zeros in the signal will produce a measurable output spike from the correlator, and some of these spikes will fall into the assigned time windows for detected signals, the probability of false detects cannot be too low.

As for the SCH midamble, it has been specifically designed to possess very good cross-correlation properties with the signals, and its autocorrelation function is essentially contained in a single-symbol length. The only problem with this sequence is its relatively short length—64 symbols—that severely limits the dynamic range of the measurement.

The TCH training sequences are just 26 bits long and do not have the required dynamic range. Combining multiple copies of training sequences causes the measurement speed to slow to an unacceptable level.

Approaches based on sensing fixed patterns in received signals, for example, the FCCH burst used in GSM-type systems for frequency correction, have been disclosed in a patent application published Oct. 25, 2001 as No. 2001/0034208A1 entitled "Method and Apparatus for Co-Channel Interference Measurements and Base Station Color Code Decoding for Drive Tests in TDMA, Cellular, and PCs Networks" now U.S. Pat. No. 6,931,235, and No. 2004/0166809A1 published Aug. 26, 2004 and entitled "Method and Apparatus for Co-Channel Interference Measurements and Interference Component Separation Based on Statistical Signal Processing in Drive-Test Area" both of which are assigned to the assignee hereof. The '208 and '809 published applications are incorporated herein by reference. Notwithstanding the known approaches, there continues to be a need for a method and apparatus for determining signal strength, power levels of various signals throughout an area of interest that do not suffer from the limited dynamic range and poor cross and auto correlation properties.

BRIEF DESCRIPTION OF THE DRAWINGS

FIG. 5 illustrates an overall flow diagram in accordance with the invention;

FIG. 6 illustrates a flow diagram of a signal collection process;

FIG. 7 illustrates a flow diagram of digital data demodulation and decoding;

FIG. 8 illustrates a flow diagram of signal cluster identification and cluster assignment; and FIG. 9 illustrates a process for a signal point extraction.

DETAILED DESCRIPTION OF THE INVENTION

Figure 1:
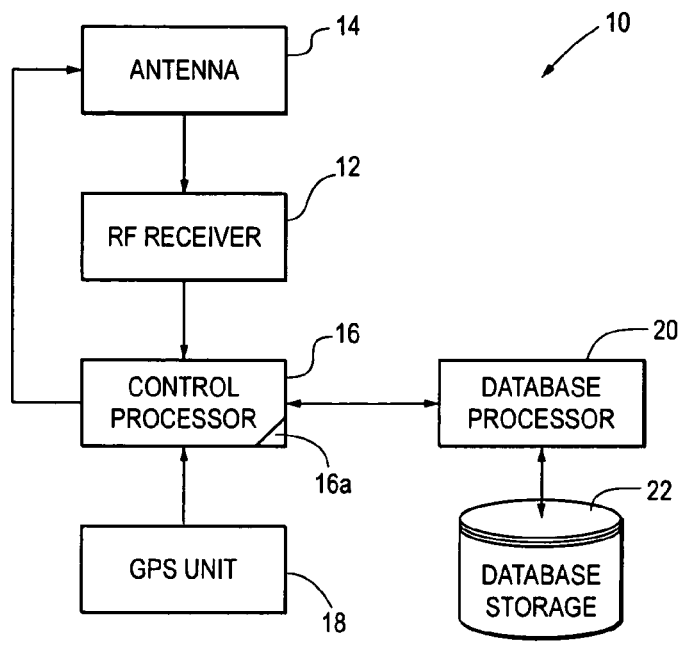
FIG. 1 illustrates a functional block diagram of an apparatus according to an embodiment of the present invention.

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

The present invention may be embodied as a method for determining individual levels of signal components corresponding to control channels or as a device that implements the method.

Levels of signal components transmitted by each of the co-channel base stations in the area under test in a wireless network are measured and associated with the appropriate (originating) base station in presence of co-channel and adjacent-channel interference. This is done in a fully functional network without interrupting service. Embodiments of the present invention incorporate an "area-measurement" approach.

The process of the present invention determines which of the previously found signal components correspond to respective base stations. The final result is a geographical data base of signal components from each of the base stations working in the frequency channel that can be used to map coverage of each of the stations cleared from the interference of other co-channel and adjacent-channel stations. It is also possible to map co-channel and adjacent channel interference levels existing between specific stations and use this data base as an input to frequency-planning and network-optimization software or manual processes.

In one aspect of the invention, variable patterns associated with a selected signal, such as SCH bursts in GSM-type systems, are predicted based on at least one suitable measurement of the respective signals. Correlation processes can then be used to determine if other sensed signals, which might not be decodable, are the same as, or include the respective signals. Advantageously, the use of variable patterns can be expected to increase dynamic range beyond 20 db.

In another aspect of the invention, a drive test can be conducted in a region of interest. All data samples can be stored prior to trying to decode the samples for base station identification code (BSIC) and frame number (FN). Where a BSIC and FN can be decoded for a current burst, other associated bursts, which carry variable patterns of interest, can be synthesized.

Subsequently, one or more correlation process can be carried out relative to the synthesized burst(s) and portions of one or more signals which might be non-decodable. Where there is an acceptable degree of correlation between the synthesized and sensed burst(s) a determination can be made as to which base station is the source thereof, and a power level can be associated with that signal.

In yet another aspect of the invention, the synthesizing and correlation processes can be carried out in relation to a region to establish those signals which might have emitted from a common base station. Field strengths of respective signals can then be associated with locations where they have been received to produce mappings or signal patterns associated with each member of a predetermined group of base stations.

In a further aspect of the invention, synthesized variable patterns (such as SCH bursts) can then be projected to other regions where the respective signal can be expected to be present. The correlation process(s) can be used to determine if the expected signal is in fact present in such region(s).

Preferably correlation processing will be carried out relative to a slidable time window. Time of arrival of a synthesized burst can be predicted within a predetermined range. Correlation processing can then be carried out in that range of time between the synthesized burst and respective portions of stored signal samples, which might be non-decodable or include other signals, where the synthesized signal should be found.

In accordance with the invention, a plurality of wireless data samples can be analyzed. Based on information carried by the samples, a plurality of sources of at least some of those samples can be established. For each sample and each source, an expected part or representation (for example, a bit pattern corresponding to a selected type of signal information) of a signal from the source can be synthesized. The signal samples can be correlated with the expected representation to determine if a signal from that source is present in the respective sample. All samples decodable or not can be processed with respect to all identified signal sources.

One advantage of embodiments of the present invention, in addition to expected greater processing gains is that only a single decodable signal sample, from a given source, is required. This sample can then be used to synthesize expected instances thereof at different times and locations. Then the correlation process can be used to determine if the expected signal is present at the different location and time even if the BSID or FN of the sample measured at that location and time can not be decoded.

One embodiment of the present invention can function as a power meter. It cannot only can measure signal strength of a sample but can identify its source even it the strength of the signal is such that it can not be decoded.

FIG. 1 illustrates a block diagram of an apparatus 10 according to an embodiment of the present invention. An RF receiver 12 produces a composite signal received via an antenna 14. A control processor 16 receives RF data from the RF receiver 12 and coordinate data from a GPS receiver 18.

The data to be recorded for each sample at each measurement point is directed from the control processor 16, via control software 16a, to a data base processor 20 and stored in a data storage device 22. Alternatively, the invention can be embodied so that the functions of the control processor 16, software 16a, and the data base processor 20 are merged into a single processor. Processors usable with the present invention may be known Pentium™ type processors executing Windows™ based software.

An example of an RF receiver includes, but is not limited to a GSM multi-channel scanner. The GPS receiver 18 may be an external unit, or may be integral with any of the other components.

The signal samples are obtained during a drive-test over a broad area that covers most of the interfering co-channel cells of interest. However, complete coverage without gaps is not required.

Figure 2:
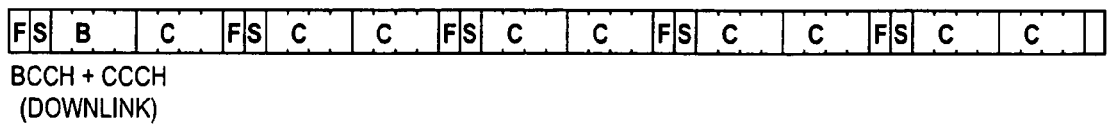
FIG. 2 illustrates a known multi-frame organization for a GSM-type system.

FIG. 2 illustrates the structure (per GSM standards) of a downlink BCCH multi-frame which incorporates 51 TDMA frames. The downlink multi-frame illustrates frequency correction, FCCH, frames (F) as well as synchronization, SCH, frames(s). Preferably a sample will encompass at least 12 frames since one SCH burst occurs every 10 or 11 frames.

Figure 3:
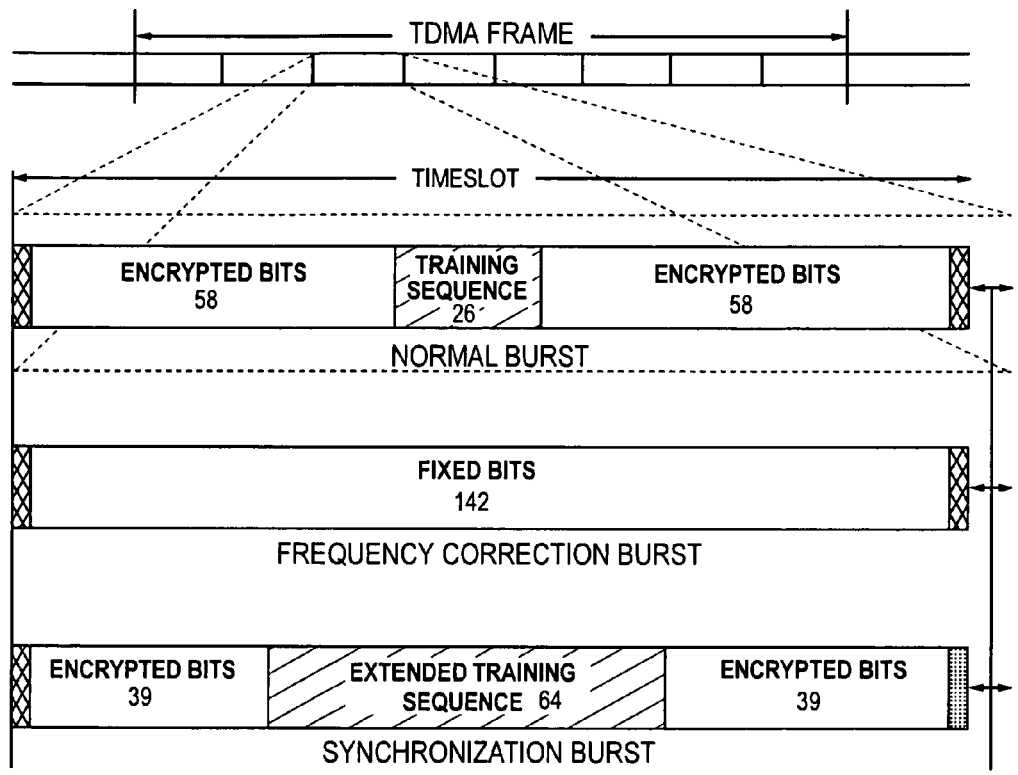
FIG. 3 illustrates burst structures of normal bursts, frequency correction bursts and synchronization bursts.

FIG. 3 illustrates representative burst structures for a normal information carrying frame, a frequency correction burst, FCCH, and a synchronization burst SCH. The SCH burst includes a fixed 64-bit training sequence, a midamble, with a sharp autocorrelation function. Seventy-eight variable information bits surround the midamble. The information bits, as is known, are convolutionally encoded. It will be understood that the exact form of encoding is not a limitation of the invention.

Figure 4:
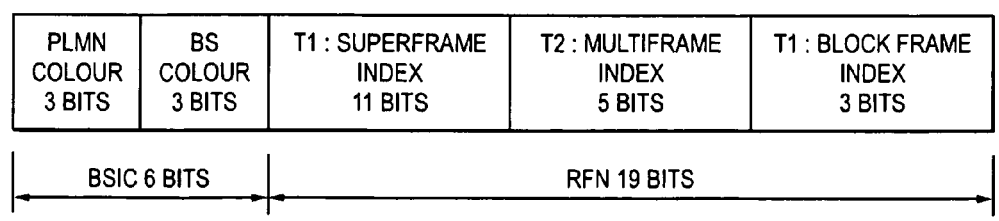
FIG. 4 illustrates information fields of a synchronization burst.

FIG. 4 illustrates the decoded information fields of conventional GSM systems. Among other information, the identity of the service provider and respective base station are included.

FIG. 5 illustrates an overall view of process 100 which embodies the invention. In an initial step 102, a drive test is conducted for purposes of detecting and acquiring samples of signals of interest. As the signals are being collected, GPS coordinates and arrival times are associated with the respective collected samples. The samples' coordinates and arrival times are stored in a data base for subsequent analysis.

In step 104, signals in the collected plurality of samples which have a decodable SCH pattern are located and decoded, the results being stored in the data base. In step 106, the previously decoded samples are grouped into clusters according to the corresponding originating cells, based on their cell IDs and/or BSIC values. For each of the signal samples, the signal's time of arrival (TOA) is determined. The timing schedule of the cell and expected contents of SCH bursts as well as their TOAs are projected for each of the frame numbers and locations encompassed by the drive-test session.

In a step 108, using the decoded SCH pattern, a portion of that signal, which should correspond to a time of arrival of at least one of the members of the plurality of collected samples is synthesized. Subsequently, a correlation process is carried out with at least a portion of the synthesized signal and a sample of the selected plurality. If the correlation is present, the signal strength for that sample can be determined and stored along with an indicium of source (base station) for use in subsequent analysis.

FIG. 6 illustrates aspects of a sample collection process 200. In a step 202 eleven or more frames of incoming signal(s) are received and digitized. In a step 204 the samples are stored in a data base. In a step 206 respective GPS coordinates are obtained. In a step 208 the coordinates are stored along with a time stamp in the same data base. The process continues until all samples have been evaluated and stored.

After or concurrently with the drive test, decoding of the stored samples can be carried out as illustrated by process 300 of FIG. 7. An attempt is made to decode digital information in the signal whenever possible where the signal is relatively free from interference, particularly in proximity to the source base station or far from other interfering stations. The SCH burst of the synchronization channel is located and decoded. Preferably the following information is stored in a data base for each decoded instance of the SCH burst:

1) (Time of Arrival TOA);
2) Latitude and Longitude;
3) TDMA Frame Number (FN);
4) Base-Station Identification Code (BSIC);
5) Where available, transmitting station cell ID from BCCH layer-3 messages received from the same signal component.

As illustrated in step 302, Layer 3 information is decoded where possible for available signal records; messages are stored with time and location information. In step 304 an attempt is made to find and decode the contents of the SCH bursts including the 19-bit reduced frame number, RFN (see FIG. 4.) as well as the BSIC data fields. The 6-bit base station color code or BSIC data fields though not unique are useful in helping identify signals' originating station, assuming that the signal at the time of decoding has a high enough signal-to-interference ratio so that information can be recovered. The 19-bit RFN includes sub-parameters which facilitate reconstruction of the frame number (FN) of the corresponding SCH burst in the multi-frame.

It will be understood that time of arrival of the SCH burst can be determined relative to an internal clock of the receiver 12. The time of arrival depends on the timing of the sending station as well as propagation delays between the sending station and the test vehicle. The time of arrival can be measured relative to the number of symbols from the beginning of the time base. Alternately it can be measured in seconds preferably with the internal data base synchronized by GPS receiver 18.

FIG. 8 illustrates a process 400 for signal cluster identification and cluster assignment to base transmitting stations (BTS), or sources. Each cluster corresponds to or is associated with a single base station or source.

In the process 400, successfully decoded points, or samples, are first grouped according to source of the signals. Source identification can be based on either the decoded cell ID, which produces a positive identification, or based on the base station identification or color code (BSIC value) together with the location of the measurement point. If the measurement point is situated close to a sector with the same BSIC then it is likely to be originated by the subject sector.

As illustrated in step 402, for each of the decoded cell ID and/or corresponding BSIC values which are stored in the data base 22, a determination is made as to those data records, or decodable signal samples, that form a cluster based on point location, signal strength, BSIC and cell ID values as well as proximity to the originating BTS. The clusters are associated with respective originating cells, or sources.

In step 404, the timing of the SCH burst is determined for the cell, or source, based on the known locations of the BTS and measurement points, known times of arrival. Propagation delays are calculated and appropriate statistical averaging can be carried out as would be understood by those of skill in the art. This operation involves calculating propagation delays and true times of transmission for every measurement. Since the positions of both the transmitter and the receiver are known in each case, it is possible to calculate the distance between them:

$$d_{i,j} = R_o \cdot \sqrt{(\text{long}_i - \text{long}_j)^2 + (\text{lat}_i - \text{lat}_j)^2 \cdot \cos^2(\text{lat}_i)} \quad (1)$$

where
$R_o$ is Earth's radius,
$\text{lat}_i$—latitude, in radians, of the source sector with index i,
$\text{lat}_j$—latitude of the measurement point with index j,
$\text{long}_i$—longitude of the sector i,
$\text{long}_j$—longitude of the point j.

Accordingly, the true transmission time of a received SCH burst is $$T_{i,j} = \tau_{i,j} - c \cdot d_{i,j} \quad (2)$$

where
$T_{i,j}$ is the true SCH transmission moment of sector i as determined using the measurement j,
$\tau_{i,j}$ is the measured time of reception of burst j from sector i,
c—speed of light.

The timing information can be stored in the associated table.

In step 406, the timing schedule and expected values of the RFN for respective SCH bursts over the time frame of the drive test can be calculated. These are stored in the associated table.

The values of $T_{i,j}$ are stored in the table with the rest of the measurements, as described above.

An exemplary process 500 of extracting points corresponding to specific originating sectors from the I and Q sample data base is illustrated in the flow diagram of FIG. 9. Processing is based on evaluating signals assigned to each cluster, step 502.

For a selected cluster or signal source, in step 504, for each signal sample in the data base, the expected SCH waveform is synthesized based on the expected TOA, BSIC and RFN number.

In step 506, a correlation process or processes can be carried out to correlate the respective signal sample in an expected time window with the synthesized wave form. If the expected SCH pattern is found, step 510, the signal strength is calculated and stored in the sector table, step 512. If the expected SCH is not found, and it is not the last record for in the data base, step 514, the process is repeated. Where the last record has been evaluated, if there are additional clusters, step 516 the process is repeated.

The process produces a data base that contains for each correlated sample, power level at the sampled location and time as well as source of the sample (BSIC and cell ID). This data base can then be used for a multitude of analyses including, but not limited to, optimizations, frequency planning, co-channel and adjacent-channel interference, step 518.

Those of skill will understand that in one embodiment of the invention software for analyzing a plurality of previously collected signal samples can be provided in downloadable form or pre-recorded on a computer readable medium. Such software can, but need not, be executed by processor 16. It can be executed by any processor which has access to the plurality of samples. Further, the sources of the signals are not a limitation of the invention. Sources can include all types of transmitters in wireless systems without limitation.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. An apparatus comprising:
    an antenna;
    an RF receiver coupled to the antenna;
    a data storage device;
    control circuits including control software, coupled to the RF receiver, and the data storage device, the control software storing collected samples of a plurality of received wireless signals, along with time of arrival and location of receipt in the data storage device; and
    analysis software recorded on a computer readable medium, the software, responsive to stored, collected samples selects at least one sample and, synthesizes an expected representation of a portion of a waveform from a source including additional software that correlates the one sample with the representation.

2. An apparatus as in claim 1 where the analysis software identifies sources of collected, at least partly decodable, signals in accordance with a predetermined criterion.

3. An apparatus as in claim 1, where responsive to selected results of correlation processing, a respective signal strength indicium is associated with the one sample.

4. An apparatus as in claim 1 where the software synthesizes a representation of a variable data pattern emitted by the source with respect to an expected time of arrival of the data pattern.

5. An apparatus as in claim 1 where the additional software attempts to establish correlations between a plurality of stored, collected samples, and respective representations.

6. An apparatus as in claim 1 where the additional software carries out a correlation process relative to a predetermined time of arrival of the expected representation.

7. An apparatus as in claim 6 where a correlation time interval is established relative to the time of arrival.

* * * * *